(12) United States Patent
Fitzpatrick (10) Patent No.: US 9,931,773 B2
(45) Date of Patent: Apr. 3, 2018

(54) INJECTION MOLDING SYSTEM AND METHOD OF FABRICATING A COMPONENT

(71) Applicant: EXTRUDE TO FILL, LLC, Maple Park, IL (US)

(72) Inventor: Richard Ernest Fitzpatrick, Loveland, CO (US)

(73) Assignee: Extrude To Fill, LLC, Loveland, CO (US)

( * ) Notice: Subject to any disclaimer, the term of this patent is extended or adjusted under 35 U.S.C. 154(b) by 165 days.

(21) Appl. No.: 14/959,921

(22) Filed: Dec. 4, 2015

(65) Prior Publication Data

US 2016/0158980 A1    Jun. 9, 2016

Related U.S. Application Data

(60) Provisional application No. 62/087,414, filed on Dec. 4, 2014, provisional application No. 62/087,449, filed
(Continued)

(51) Int. Cl.
*B29C 45/50* (2006.01)
*B29C 45/18* (2006.01)
(Continued)

(52) U.S. Cl.
CPC .............. *B29C 45/18* (2013.01); *B29C 45/03* (2013.01); *B29C 45/23* (2013.01); *B29C 45/40* (2013.01);
(Continued)

(58) Field of Classification Search
CPC ......... B29C 45/74; B29C 45/47; B29C 45/23; B29C 45/5092; B29C 45/60
See application file for complete search history.

(56) References Cited

U.S. PATENT DOCUMENTS 2,402,805 A  *  6/1946  Cousino .................. B29C 45/07
                                                    264/328.15
2,471,813 A  *  5/1949  Cousino .................. B29C 45/47
                                                    425/562
(Continued)

FOREIGN PATENT DOCUMENTS

CN         100590039 C      2/2010
DE          2437248 A1      2/1976
(Continued)

OTHER PUBLICATIONS

U.S. Appl. No. 15/488,679, filed Apr. 17, 2017.
(Continued)

*Primary Examiner* — Jill L Heitbrink
(74) *Attorney, Agent, or Firm* — Dorsey & Whitney LLP (57) ABSTRACT

The present disclosure provides an injection molding apparatus and a method of fabricating a component. The apparatus may include a barrel comprising a first section having an end associated with a mold through a nozzle or a gate insert, a second section coupled to a hopper configured to fill a material into the barrel, and a temperature transition section between the first section and second section. The apparatus may include an extrusion screw placed inside the barrel and rotatable relative to the barrel. The apparatus may include one or more heaters associated with the first section of the barrel to heat the material inside the barrel. Rotation of the extrusion screw relative to the barrel may continuously extrude the material into the mold.

25 Claims, 9 Drawing Sheets

Related U.S. Application Data on Dec. 4, 2014, provisional application No. 62/087,480, filed on Dec. 4, 2014.

(51) Int. Cl.

| | | |
|---|---|---|
| *B29C 45/03* | (2006.01) | |
| *B29C 45/23* | (2006.01) | |
| *B29C 45/40* | (2006.01) | |
| *B29C 45/73* | (2006.01) | |
| *B29C 45/74* | (2006.01) | |
| *B29C 45/76* | (2006.01) | |
| *G05B 19/042* | (2006.01) | |
| *H02K 7/14* | (2006.01) | |
| *B29C 45/47* | (2006.01) | |
| *B29C 45/78* | (2006.01) | |
| *B29C 45/17* | (2006.01) | |
| *B29K 105/26* | (2006.01) | |

(52) U.S. Cl.
CPC .............. *B29C 45/47* (2013.01); *B29C 45/73* (2013.01); *B29C 45/74* (2013.01); *B29C 45/76* (2013.01); *B29C 45/78* (2013.01); *G05B 19/042* (2013.01); *H02K 7/14* (2013.01); *B29C 2045/1792* (2013.01); *B29C 2045/1875* (2013.01); *B29K 2005/00* (2013.01); *B29K 2105/26* (2013.01); *B29K 2995/0008* (2013.01); *G05B 2219/2624* (2013.01)

(56) References Cited

U.S. PATENT DOCUMENTS

| | | | |
|---|---|---|---|
| 2,487,426 A * | 11/1949 | Cousino | ............... B29C 45/47 264/328.11 |
| 2,734,226 A | 2/1956 | Willert | |
| 3,001,233 A | 9/1961 | Ernst | |
| 3,025,568 A | 3/1962 | Hardy | |
| 3,335,461 A | 8/1967 | Schwartz | |
| 3,477,097 A | 11/1969 | Plymale | |
| 3,771,698 A | 11/1973 | Loichen | |
| 3,771,935 A | 11/1973 | Loichen | |
| 3,806,294 A | 4/1974 | Hehl | |
| 3,902,665 A | 9/1975 | Hendry | |
| 4,025,274 A | 5/1977 | Uemura et al. | |
| 4,154,536 A | 5/1979 | Sokolov | |
| 4,183,448 A | 1/1980 | Nash | |
| 4,311,446 A | 1/1982 | Hold et al. | |
| 4,699,581 A | 10/1987 | Nagasaka et al. | |
| 4,867,938 A | 9/1989 | Schad et al. | |
| 5,013,231 A | 5/1991 | Fujita et al. | |
| 5,164,207 A | 11/1992 | Durina | |
| 5,249,947 A | 10/1993 | Inaba et al. | |
| 5,363,747 A | 11/1994 | Clark et al. | |
| 6,059,556 A | 5/2000 | Koike | |
| 6,109,910 A | 8/2000 | Sekido | |
| 6,261,081 B1 | 7/2001 | Speck et al. | |
| 6,887,062 B1 | 5/2005 | Burg et al. | |
| 7,172,333 B2 | 2/2007 | Anderson et al. | |
| 7,291,297 B2 | 11/2007 | Weatherall et al. | |
| 7,431,583 B2 | 10/2008 | Takatsugi et al. | |
| 7,906,048 B2 | 3/2011 | Fitzpatrick | |
| 8,062,025 B2 | 11/2011 | Klobucar et al. | |
| 9,517,582 B2 | 12/2016 | Fitzpatrick | |
| 9,623,593 B2 | 4/2017 | Fitzpatrick | |
| 9,808,971 B2 * | 11/2017 | Fitzpatrick | .............. B29C 45/13 |
| 2002/0084543 A1 | 7/2002 | Buja | |
| 2002/0170696 A1 | 11/2002 | Akers et al. | |
| 2003/0034577 A1 | 2/2003 | Seta et al. | |
| 2004/0080064 A1 | 4/2004 | MacPhee et al. | |
| 2004/0119204 A1 | 6/2004 | Nishigaki | |
| 2005/0161847 A1 | 7/2005 | Weatherall et al. | |
| 2006/0197254 A1 | 9/2006 | Onishi | |
| 2006/0261521 A1 | 11/2006 | Beaumont | |
| 2008/0099943 A1 | 5/2008 | Yamagiwa et al. | |
| 2008/0121497 A1 | 5/2008 | Esterson et al. | |
| 2009/0057300 A1 | 3/2009 | Taylor et al. | |
| 2009/0115086 A1 | 5/2009 | Manda | |
| 2010/0072669 A1 | 3/2010 | Smith et al. | |
| 2010/0295199 A1 | 11/2010 | Zhang et al. | |
| 2012/0205219 A1 | 8/2012 | Nickerson et al. | |
| 2016/0158981 A1 | 6/2016 | Fitzpatrick | |
| 2016/0158985 A1 | 6/2016 | Fitzpatrick | |
| 2016/0279851 A1 | 9/2016 | Fitzpatrick | |
| 2016/0279852 A1 | 9/2016 | Fitzpatrick | |
| 2016/0279854 A1 | 9/2016 | Fitzpatrick | |

FOREIGN PATENT DOCUMENTS

| | | |
|---|---|---|
| DE | 3711080 A1 | 10/1988 |
| DE | 4239776 A1 | 6/1994 |
| EP | 0057148 A2 | 8/1982 |
| GB | 953217 A | 3/1964 |
| GB | 1199445 A | 7/1970 |
| GB | 1359126 A | 7/1974 |
| GB | 1513375 A | 6/1978 |
| JP | 58209539 A | 12/1983 |
| JP | 60024914 A | 2/1985 |
| JP | S62236714 A | 10/1987 |
| JP | S63262219 A | 10/1988 |
| JP | H01301215 A | 12/1989 |
| JP | H04151218 A | 5/1992 |
| JP | H0524074 A | 2/1993 |
| JP | H06226791 A | 8/1994 |
| JP | H07214656 A | 8/1995 |
| JP | H08264578 A | 10/1996 |
| JP | 2003297538 A | 10/2003 |
| JP | 2005111757 A | 4/2005 |
| TW | I251532 B | 3/2006 |
| TW | 201414596 A | 4/2014 |
| WO | 2004057918 A1 | 7/2004 |
| WO | 2016090274 A1 | 6/2016 |
| WO | 2017013097 A1 | 1/2017 |

OTHER PUBLICATIONS

International Bureau, "International Search Report and Written Opinion dated Apr. 11, 2016", PCT Patent Application No. PCT/US2015/064045, dated Apr. 11, 2016, 13 Pages.

International Bureau, "International Search Report and Written Opinion dated Mar. 30, 2016", PCT Patent Application No. PCT/US2015/064073, dated Mar. 30, 2016, 11 Pages.

International Bureau, "International Search Report and Written Opinion dated Feb. 5, 2016", PCT Patent Application No. PCT/US2015/064110, dated Feb. 5, 2016, 11 Pages.

International Bureau, "Internation Preliminary Report on Patentability", PCT Application No. PCT/US2015/064110, dated Feb. 3, 2017, 35 Pages.

Reimker, et al., "Intrusionsanlage Zum Aufarbeiten Gemischter Kunststoffe \ Intrusion Plant for Reprocessing Mixed Plastics.", Kunststoffe, Carl Hanser Verlag, Munchen, Germany, vol. 83, No. 1, pp. 23-25, XP000330655, ISSN: 0023-5563, Abstract, 1993, 3 Pages.

RJG, "Sequential Valve Gate Control A New Opportunity For Productivity", www.rjginc.com/paperclip/articles/sequetial_valve.pdf, Mar. 2, 2004, 10 Pages.

U.S. Appl. No. 14/960,115, filed Dec. 4, 2015.
U.S. Appl. No. 14/960,101, filed Dec. 4, 2015.
U.S. Appl. No. 15/177,271, filed Jun. 8, 2016.
U.S. Appl. No. 15/177,276, filed Jun. 8, 2016.
U.S. Appl. No. 15/177,301, filed Jun. 8, 2016.
U.S. Appl. No. 15/177,302, filed Jun. 8, 2016.

* cited by examiner

FIG.8

INJECTION MOLDING SYSTEM AND METHOD OF FABRICATING A COMPONENT

CROSS-REFERENCES TO RELATED PATENT APPLICATIONS

This patent application claims the benefit under 35 U.S.C. 119(e) of U.S. Provisional Patent Application No. 62/087, 414, entitled "Extrude-to-Fill Injection Molding and Extrusion Screw," filed on Dec. 4, 2014, U.S. Provisional Patent Application No. 62/087,449, entitled "Nozzle Shut-off for Extrude-to-Fill Injection Molding System," filed on Dec. 4, 2014, and U.S. Provisional Patent Application No. 62/087, 480, entitled "Control System for Extrude-to-Fill Injection Molding," filed on Dec. 4, 2014, each of which is hereby incorporated herein by reference in its entirety.

FIELD

The present disclosure is directed generally to an injection molding system. More specifically, the present disclosure is directed to an injection molding system and a method of fabricating a component.

BACKGROUND

Figure 1:
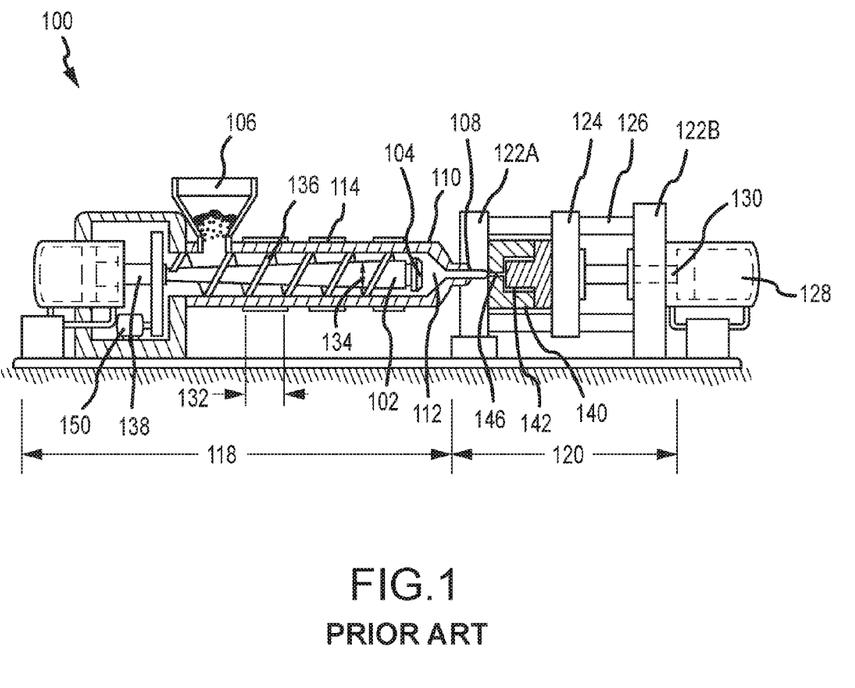
FIG. 1 is a schematic diagram of a traditional injection molding system.

A traditional injection molding system melts a material, such as a plastic, primarily by shear heat that is dynamically generated by rotation of an extrusion screw. Dynamically generated shear heat in the traditional injection molding system is dependent on the use of petroleum-based plastic resins of a high level of purity and consistency. FIG. 1 is a schematic diagram for a traditional injection molding system 100. An injection zone 112 is located in front of an extrusion screw 102 to hold a molten material prior to injection. A check ring 104, or a non-return valve, is used to allow a forward melt flow during a recovery extrusion stage that is between shots and to prevent the molten material from back flow to the extrusion screw 102. The back flow may occur when an injection pressure is applied to the melt. The material may be molten by using mostly shear heat. For example, the molten state may be created by about 75% shear heat and about 25% conduction heat generated from band heaters 114.

The traditional extrusion screw 102 is designed with a large pitch 132 to promote shear heat generation and mix hot and cold plastic. As shown in FIG. 1, a root diameter 134 of the screw 102 is narrower near a hopper 106 which feeds raw material through an inlet of a barrel 110. Along the length of the extrusion screw toward the nozzle 108, the root diameter increases to create a compression zone to promote shear heat generation. A flight height 136 of the screw 102 decreases toward the nozzle 108, which reduces the space between the screw 102 and the barrel 110.

During a recovery extrusion stage, the molten material is transported along the length of the screw 102 into the injection zone 112 in the barrel 110 by rotating the extrusion screw using a motor 150. The injection zone 112 is between a nozzle 108 and the check ring 104 at the end of the extrusion screw 102. The molten material is trapped in the injection zone by the cold slug, which seals the nozzle 108 after the injection cycle and prevents the plastic from flowing into a mold 140 through a gate 146 and runners 142 during the recovery extrusion stage.

During an injection cycle, the screw 102 is driven forward without rotation under a very high injection pressure by cylinder 138. The screw 102 and check ring 104 can function together as a plunger to inject the molten material into the mold. The recovery extrusion stage may take only 10-25% of the entire molding time such that the shear heat may also be lost when the extrusion screw does not rotate except during the recovery extrusion stage.

The traditional injection molding system 100 relies on the formation of a cold slug in the nozzle 108 between each shot. The cold slug of plastic causes one of the greatest inefficiencies for the traditional injection molding system 100. The cold slug requires a very high pressure to be dislodged from the nozzle 108 to allow a molten material to flow into a mold cavity. The high injection pressure is required to push the molten material into the mold cavity through the runners 142. It is common to require an injection pressure between 20,000 and 30,000 psi in order to obtain a pressure of 500 psi to 1,500 psi in the mold cavity. Due to the high injection pressure, the traditional injection molding system 100 requires a thick wall of the barrel 110, which reduces the heat conduction to the material from the band heaters 114 that surround the barrel 110.

The traditional injection molding system 100 may use either a hydraulic system or an electric motor 128 for powering a clamp system 120, which may include stationary platens 122A-B, a moveable platen 124, and tie rods 126. A clamping cylinder 130 must apply sufficient pressure to hold the mold closed during injection. The traditional injection molding system requires large and costly power sources for both the injection system 118 and the clamp system 120. These power sources must be supported by a massive machine structure, which increases facility infrastructure costs including electrical supply, thick concrete footings or floors and oversized HVAC systems that are expensive to procure, operate and maintain.

The shear heat generated by the traditional injection molding system limits its capability to mold certain materials, such as bio-based plastics. Bio-based plastics are degraded by the pressures applied in the traditional injection molding system, reacting adversely to the pressure the machine generates for creating shear heat in process of injection molding petroleum-based plastics. A recently developed injection molding system disclosed in U.S. Pat. No. 8,163,208, entitled "Injection Molding Method and Apparatus" by R. Fitzpatrick, uses static heat conduction to melt plastic, rather than shear heat. The disclosed system can mold bio-based plastics into small parts. Specifically, the disclosed system includes a plunger that is positioned within a tubular screw and runs through the center of the tubular screw. Generally, moving the entire screw forward during the injection cycle would require a large injection cylinder. In the disclosed system, the entire screw of a larger diameter does not move. Only the plunger is advanced, which requires a much smaller injection cylinder to apply the force on the plunger. The disclosed system recovers and transports the molten material in front of the plunger between each shot or injection cycle, and injects the molten material into a mold by the plunger. The part size is determined by the area of the plunger multiplied by the length of plunger stroke as that defines the volume during injection, but that part size is limited to the small displacement volume of the plunger, typically about 3-5 grams of plastic, which is a small shot size. It is desirable to mold parts with unlimited shot sizes.

Also, the traditional injection molding system 100 requires manual purging operation by experienced operators at start-up. For example, an operator may first turn on the barrel heaters 114 and wait until the screw 102 embedded in plastic or resin is loosened to allow the screw motor 150 to be turned on. A purging process is required for generating initial shear heat. The purging process begins when the operator rotates the screw 102 to move the resin forward, and the screw 102 is driven backward into its injection position. Then, the operator activates the injection force to drive the screw 102 forward, allowing the resin to exit the nozzle 108 onto the machine bed. The cycling process is repeated to generate initial shear heat until the resin exits from the nozzle 108, which suggests that the material may be hot enough such that the operator may start molding. The manual operation is highly subjective and requires skilled operators to start machines and adjust molding processes. The subsequent molding operations must be consistent without interruptions to satisfy shear heat generation requirements.

Documents that may be related to the present disclosure in that they include various injection molding systems include U.S. Pat. No. 7,906,048, U.S. Pat. No. 7,172,333, U.S. Pat. No. 2,734,226, U.S. Pat. No. 4,154,536, U.S. Pat. No. 6,059,556, and U.S. Pat. No. 7,291,297. These proposals, however, may be improved.

There still remains a need to resolve the issues of the present injection molding systems to develop an automated and more efficient system that may provide additional flexibility for various applications.

BRIEF SUMMARY

The present disclosure generally provides an injection molding system, which may be referred to herein as an extrude-to-fill (ETF) injection molding apparatus, machine, or system. In an embodiment, the injection molding apparatus may include a barrel comprising a first section having an end coupled to a mold through a nozzle or a gate insert, a second section coupled to a hopper configured to fill a material into the barrel, and a temperature transition section between the first section and second section. The apparatus may also include an extrusion screw inside the barrel. The apparatus may further include one or more heaters being placed outside the first section of the barrel to heat the material inside the barrel, wherein the hopper is configured to circulate a cooling fluid.

In an embodiment, an extrude-to-fill injection molding apparatus may include an extrusion screw being hollow inside configured to receive a heater inside the extrusion screw. The apparatus may also include a barrel outside the extrusion screw. The barrel having one end is coupled to a mold through a nozzle or gate insert. The apparatus may also include a hopper coupled to an opposite end of the barrel and configured to feed a material into the barrel, the hopper configured to circulate a cooling fluid. The apparatus may further include one or more heaters placed outside of the barrel at a distance from the hopper to heat the material, such that the extrusion screw pumps the molten material into the mold through an opening of the nozzle.

In an embodiment, a method is provided for fabricating a component. The method may include turning on one or more heaters to melt a material inside a barrel. The method may also include rotating an extrusion screw to pump the molten material into a mold until the mold is filled. The method may further include reversing rotation of the extrusion screw to decompress the barrel and to break the non-Newtonian action of the material.

In an embodiment, the injection molding apparatus may include a barrel comprising a first section having an end associated with a mold through a nozzle or a gate insert, a second section coupled to a hopper configured to fill a material into the barrel, and a temperature transition section between the first section and second section. The apparatus may also include an extrusion screw placed inside the barrel and rotatable relative to the barrel. The apparatus may further include one or more heaters associated with the first section of the barrel to heat the material inside the barrel, wherein rotation of the extrusion screw relative to the barrel continuously extrudes the material into the mold.

In an embodiment, the injection molding apparatus may include an extrusion screw configured to rotate clockwise and counter-clockwise, a hopper coupled to a barrel outside the extrusion screw, the hopper configured to fill a material into the barrel and to circulate a cooling fluid, and one or more heaters associated with the barrel at a distance from the hopper to heat the material, such that rotation of the extrusion screw pumps the molten material into the mold through a nozzle.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

The present disclosure is provided to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

The present disclosure generally provides an injection molding system, which may be referred to herein as an extrude-to-fill (ETF) injection molding apparatus, machine, or system. The injection molding system generally provides an extrusion screw that extrudes on demand to transfer or inject molten material into a mold with an unlimited or varying shot size or volume of displacement, without requiring a purging process after periods of idle time. The shot size is the material volume that can be displaced or transferred into the mold during an injection cycle, sufficient to fill a single mold cavity or a plurality of mold cavities. The varying shot size is different from the traditional system in which the shot size is fixed, predetermined by the screw diameter and the length of injection stroke, which is the axial distance traveled by the traditional screw 102 (see FIG. 1) during an injection cycle. The traditional injection molding system 100 (see FIG. 1) executes a fixed, sequential process where shot size changes require changes to the control settings. The ETF system may extrude plastic for a specific time, until a specific mold cavity pressure is achieved, until a specific screw back pressure is achieved, until a specific screw torque load is achieved or for a pre-selected number of screw rotations to mold parts with various dimensions to provide any desired shot size.

The present ETF injection system uses heat conduction to produce a homogenous melt with substantially reduced shear heat generation. The melt may be heated to obtain a desired viscosity. By achieving the desired viscosity in a static state, less pressure is required for extrusion or injection to fill a mold cavity. Also, a lower clamp force is required for closing and holding the mold.

The ETF screw is designed to promote heat conduction to material inside the barrel and to function as a conveying pump for extruding the material under a pressure sufficiently high enough to fill mold cavities. The screw may rotate in two opposing directions and reciprocate along the axial direction. One of the benefits of reversing the rotation is to help agitate and mix the resin. When the extrusion screw rotates in one direction to pump the resin, a pattern of flow and pressure may be established. The reversal of the extrusion or rotation may disrupt the pattern of flow and disrupt the hysteresis, decompressing the system between molded part shots allowing more accurate control. The reversal of the screw mixes the resin to enhance heat conduction to achieve more consistent melt viscosity and ensures a more uniform extrudant. The screw may include an inner heater inside the screw to further assist heat conduction and may use a better heat conductor, such as brass, to conduct the heat from the inner heater.

Figure 2A:
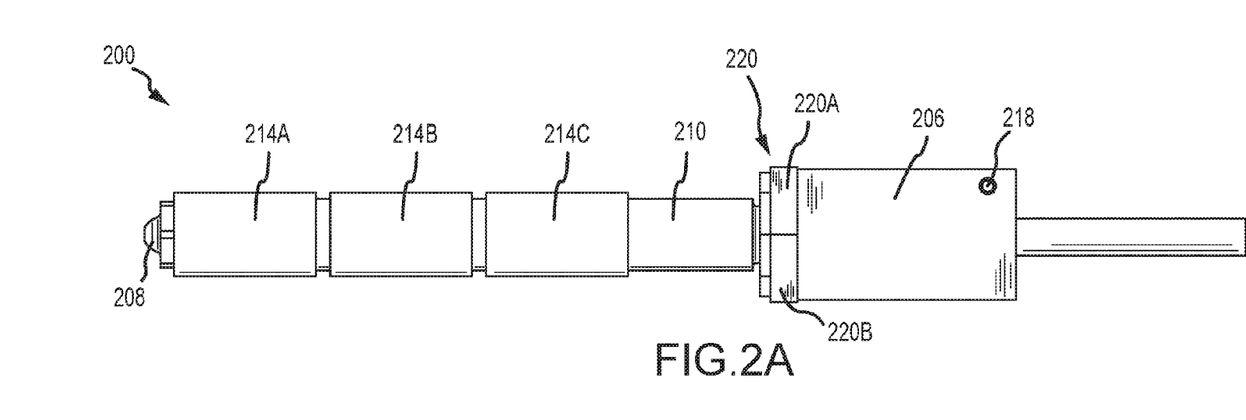
FIG. 2A is an injection molding system with an extrusion screw in accordance with embodiments of the present disclosure.
Figure 2B:
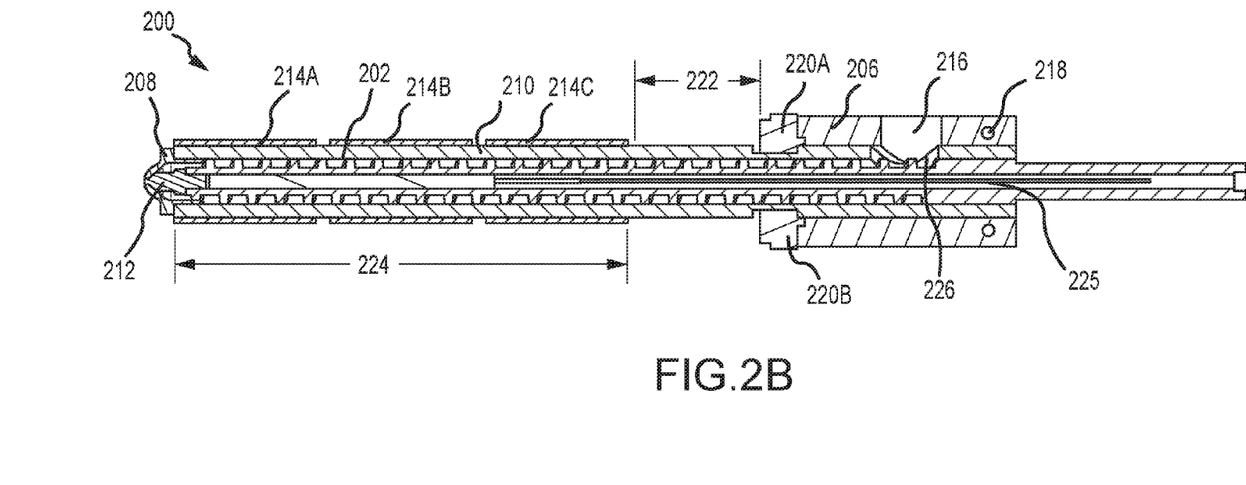
FIG. 2B is a sectional view of the injection molding system of FIG. 2A in accordance with embodiments of the present disclosure.
Figure 3:
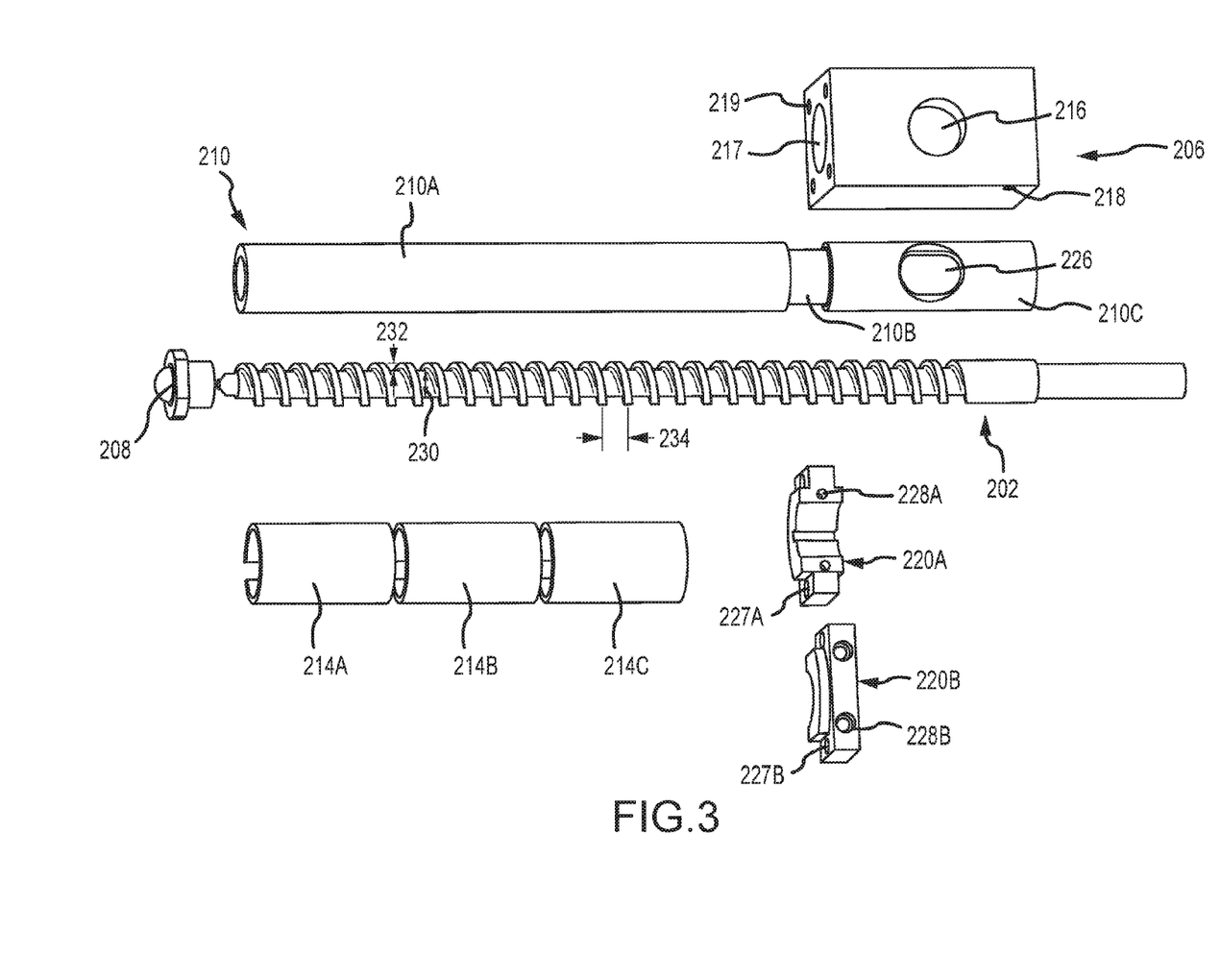
FIG. 3 is a perspective view of the injection molding system of FIG. 2A prior to assembly in accordance with embodiments of the present disclosure.

FIG. 2A is an extrude-to-fill (ETF) injection system with an extrusion screw in accordance with embodiments of the present disclosure. FIG. 2B is a sectional view of the ETF injection system of FIG. 2A. FIG. 3 is a perspective view of the components of FIG. 2A prior to assembly.

Referring generally to FIGS. 2A-3, an injection molding apparatus or system 200 is provided. The injection molding apparatus 200 includes an extrusion screw 202 positioned inside a barrel 210 (see FIG. 2B). A hopper block opening 216 may be associated with barrel inlet 226 for transferring material, typically in the form of pellets, from the hopper block 206 to the barrel 210, and a nozzle 208 may be associated with another portion of the barrel 210 for transferring molten material from the barrel 210 to a mold. One or more heaters 214 may heat the material inside the barrel 210 into a molten state, and the extrusion screw 202 may rotate within the barrel 210 to pump the material along a length of the barrel 210 and into the mold. A motor may be used to rotate the extrusion screw 202. A cylinder may be coupled to the extrusion screw 202 or the barrel 210 to move one of the screw 202 or the barrel 210 in an axial direction relative to the other of the screw 202 or the barrel 210 to open or close the nozzle 208.

The injection molding system 200 may use a cylinder or an electric motor for powering a clamp system. The clamp system may include one or more stationary platens, a moveable platen, and one or more tie rods. A clamping cylinder may apply pressure to the moveable platen to hold the mold closed during injection of the molten material into the mold. The injection molding apparatus 200 primarily uses static heat conduction, rather than shear heat generation, to melt the material within the barrel 210. By achieving a desired viscosity primarily using static heat conduction, a lower pressure is required for extruding the material into the mold and thus a lower clamp force is required for holding the mold in a closed position. As such, the injection system and the clamp system, including the cylinder or electric motor for powering a clamp system, may be smaller in size and require less power to operate than traditional injection molding systems, which generally require large and costly power sources for both the injection system 118 and the clamp system 120 (see FIG. 1). The power sources for traditional injection molding systems must be supported by a massive machine structure, which increases facility infrastructure costs including electrical supply, thick concrete footings or floors, and oversized HVAC systems that are expensive to procure, operate, and maintain.

Referring still to FIGS. 2A-3, the barrel 210 of the injection molding apparatus 200 may enclose the extrusion screw 202. More details about the extrusion screw are shown in FIG. 3. A clearance between the extrusion screw 202 and the barrel 210 is large enough to avoid shear heat generation and is sufficient to allow rotation of the extrusion screw 202 within the barrel 210. The barrel 210 may be large enough to allow an axial movement of the extrusion screw 202 inside the barrel 210.

The ETF injection molding apparatus 200 operates at a lower pressure than traditional injection molding systems. The lower operating pressure allows the barrel 210 to have a thin wall, which provides better heat conduction to the material inside the barrel 210 (see FIGS. 2A-3) than the thick wall of the traditional barrel 110 (see FIG. 1). For example, the wall thickness of the barrel 210 may be 0.125 inches to 0.250 inches thick, compared to a wall thickness of the barrel 110 of 0.750 inches to 2.00 inches on the traditional injection molding system 100 (see FIG. 1). The static heat conduction, along with the shut-off nozzle and the screw tip discussed below, generally reduces the internal barrel pressure compared to traditional injection molding systems.

The materials for forming the barrel 210 may be selected based on heat conduction more than pressure containment as a result of low extruding or injection pressure. For example, the barrel 210 may include magnetic material for inductive heating or highly conductive material such as brass or copper alloy or aluminum. In some embodiments, the barrel 210 may be formed of steel.

The hopper block 206 of the ETF injection molding apparatus 200 of FIGS. 2A-3 may include an opening 216 coupled to an inlet 226 of the barrel 210. The hopper block 206 may include a hollow portion 217 configured to slide onto the barrel 210. The hopper block 206 and the barrel 210 may be assembled such that a material in the hopper block 206 is drawn or fed into the barrel 210 through the hopper block opening 216 and the barrel inlet 226. The hopper block 206 may include one or more cooling channels 218 for circulating cooling fluid, such as water, water based compounds, or other cooling compounds, such that the extrusion screw 202 and the barrel 210 near the hopper block 206 may remain cold, for example, at room temperature.

The present ETF injection molding apparatus 200 may include a number of band heaters, such as heaters 214A-C, that are placed outside the barrel 210 and are in contact with the barrel 210. The band heater 214C closest to the hopper block 206 may be placed at a distance from a barrel collar 220. The barrel collar 220 may include two portions 220A and 220B at a front end of the hopper block 206.

Referring to FIG. 2B, the band heater 214C may be placed at a distance from the hopper block 206 such that a temperature transition region 222 in the barrel 210 may be present between the hopper block 206 and a heated region 224 where the heaters 214A-C are located. In the temperature transition region 222, the material may remain relatively cold and may act like a seal between the outside diameter of the screw 202 and the inside diameter of the barrel 210 to drive the molten material in the heated region 224 toward a mold to continuously transport the material to flow into the mold. The temperature transition region 222 may be designed to exceed a minimum length, such that the material in the transition region 222 has enough volume to act like a seal to drive the molten material in the heated region 224 into a mold. The minimum length of the temperature transition region 222 may vary depending on the application of the injection molding apparatus 200 and may be determined on a case-by-case basis.

It is important to maintain an adequate temperature transition region 222 between the cold material entering the barrel 210 from the hopper block 206 and the melted material in the heated region 224 as the cold material and transition material work with the screw auger 202 to provide the extrusion force to pump the melted material in the heated region 224. When the melted material is too close to the hopper 206, the extrusion force may be lost. The presence of an adequate amount of cold material in the temperature transition region or zone 222 is important to ensure that the cold material slides along the screw geometry to move the melted material along the heated region 224 toward the mold. If the cold material does not slide along the screw in the transition zone 222, the melted material may stick to the screw 202 in the heated region 224 and may spin around inside the barrel 210 with the screw 202.

The heaters 214A-C may be band heaters which can be placed outside the barrel 210 when assembled. The heaters 214A-C may be electric heaters, which enclose and contact the barrel 210 to heat the material inside the barrel 210.

In some embodiments, inductive heat conduction may be possible by using a magnetic barrel or magnetic screw. Induction heat generators may be used to facilitate quicker response time than electric heaters. For example, the ETF injection system 200 may use an induction heat generator along with a magnetic barrel section and/or a magnetic screw to instantly heat the barrel and the extrusion screw. In some embodiments, the barrel and/or extrusion screw may include at least a magnetic portion or section to further facilitate quicker response time.

In some embodiments, resistive heaters 225 may be used within the extrusion screw 202 along with a slip ring to deliver electric power and provide thermocouple readings for more efficient conduction of heat to the resin, as shown in FIG. 2B. A thermocouple may be added to provide feedback to control the heater 225.

Referring to FIGS. 2A-3, the present EFT injection system 200 may include a shut-off nozzle 208 at the end of the barrel 210. The system 200 may include a screw tip 212 matched to the nozzle 208 to seal the nozzle 208 between shots. The shut-off nozzle 208 allows a low pressure extrusion because no cold slug is formed and therefore is not required to be dislodged like the traditional injection molding system 100 (see FIG. 1). The screw tip 212 is placed against the nozzle 208 to seal or close the nozzle 208, which is connected to an end of the barrel 210. The extrusion screw 202 may include a hollow portion such that a resistive heater or other heating device and thermocouple may be placed inside the extrusion screw 202. The details of the screw tip design are disclosed in a related U.S. Provisional Patent Application 62/087,449, entitled "Nozzle Shut-off for Extrude-to-Fill Injection Molding System," which is incorporated herein by reference in its entirety.

The injection molding apparatus 200 may include a drive system for rotating the extrusion screw 202. For example, the present ETF injection system 200 may include an extrusion motor which rotates the screw 202 and may be controlled by electric current for driving the screw rotation. The motor may drive the screw 202 using a drive belt or chain. The present ETF system 200 may include an extrusion motor that is axially aligned with the extrusion screw 202 as a direct drive, making the ETF assembly a discreet unit facilitating the use of multiple ETF extruders on a single machine (e.g., see FIG. 8). The apparatus 200 may include a cylinder that moves the screw tip 212 into contact with the inside of the nozzle 208 or mold gate. The cylinder may move the extrusion screw 202 forward relative to the barrel 210 to bring the screw tip 212 into contact with the nozzle 208 to close or shut off the nozzle 208 or may move the barrel 210 rearward relative to the screw 202 to bring the nozzle 208 into contact with the screw tip 212 to close or shut off the nozzle 208.

As shown in FIG. 3, the extrusion screw 202 may have a constant root diameter 230 unlike the varying root diameter of the traditional extrusion screw 102 (see FIG. 1). The present extrusion screw 202 may use a comparatively small pitch 234 rather than the large pitch 132 of the traditional extrusion screw 102 as shown in FIG. 1. The small pitch 234 is designed to help pump the material into the mold while the large pitch 132 of the traditional extrusion screw 102 is more suitable for promoting shear heat generation.

Referring still to FIG. 3, screw dimensions, including screw length, screw root diameter, and screw flight height 232, may affect the shot size or part size or accuracy. For example, a large part may be molded by extruding a long screw length, a large root diameter, or a tall screw flight height 232. When the diameter of the extrusion screw becomes small, the volume of plastic extruded efficiently may be reduced, but the control of the volume extruded may be more accurate, which helps control the shot size to be consistent for each molding cycle.

The extrusion screw 202 may be made of brass or other brass alloy, which has higher heat conduction capabilities than commonly used steel in the traditional injection molding system. The brass screw may conduct the heat to the material better than the steel because the plastic moves more freely along its surface, promoting plastic mixing. The brass has a low coefficient of friction, which helps boost a pumping efficiency, especially for molding sticky materials, such as mixed/contaminated recycled resin, or starch based resins. The pumping efficiency is a measure of a volume injecting into a mold per unit time.

With continued reference to FIG. 3, the barrel 210 may include a transition section 210B between a main section 210A and an entrance section 210C. The transition section 210B may have a smaller outer diameter configured to fit to the barrel collar 220 including two portions 220A-B. The entrance section 210C includes the inlet 226 coupled to the opening 216 of the hopper block 206. Referring to FIGS. 2A, 2B, and 3, when the injection molding apparatus 200 is assembled, the heaters 214A-C may surround the main section 210A of the barrel 210, and the collar 220 may be seated in the transition section 210B of the barrel 210. The portions 220A-B of the collar 220 may be positioned on the transition section 210B of the barrel 210 and may be attached to each other, for example, with fasteners threaded into holes 228A-B formed in the collar portions 220A-B. When secured together, the collar portions 220A-B may resist rotation of the collar 220 relative to the barrel 210, and the recessed transition section 210B of the barrel 210 may inhibit axial movement of the collar 220 along the length of the barrel 210. The collar 220 may be attached to the hopper block 206 to axially and rotationally fix the hopper block 206 to the barrel 210. The barrel collar 220 may be attached to the hopper block 206, for example, by using fasteners inserted through holes 227A-B formed in the collar portions 220A-B and threaded into holes 219 formed in the hopper block 206 as shown in FIG. 3. The hopper block 206 may include a hollow portion 217 configured to slide onto the barrel section 210C. The hopper block 206 may be mounted onto the entrance section 210C of the barrel 210 such that the opening 216 of the hopper block 206 is aligned with the inlet 226 of the entrance section 210C of the barrel 210 to provide a pathway for material to enter the barrel 210 from the hopper block 206. The screw 202 may be placed inside the barrel 210 and the screw flights may extend from the entrance section 210C of the barrel 210 to the main section 210A of the barrel 210 to facilitate pumping of the material from the inlet 226 of the barrel 210 toward the nozzle 208.

The static heat conduction may facilitate an automated machine start for the present ETF injection system. Traditional injection molding machines require a purging process at start-up to generate shear heat sufficient to achieve plastic viscosity before molding. More details are disclosed in related U.S. Patent Application No. 62/087,480, entitled "Control System for Extrude-to-Fill Injection Molding," which is incorporated herein by reference in its entirety.

Most plastic raw material is provided in pellet form of approximately 1/8" to 3/16" in diameter and length and irregularities in shape and size are common. To accommodate the pellets, traditional injection molding systems have a hopper with a throat of a certain size to accept the pellets, and the extrusion screw is of a certain minimum size in both diameter and screw pitch to be able to receive the pellets from the throat of the hopper and efficiently pull the pellets into the extrusion barrel. The need for accepting pellets determines the minimum size of the screw and the barrel for traditional injection molding systems. This minimum size determines the constant screw and barrel size throughout the traditional system.

Figure 4A:
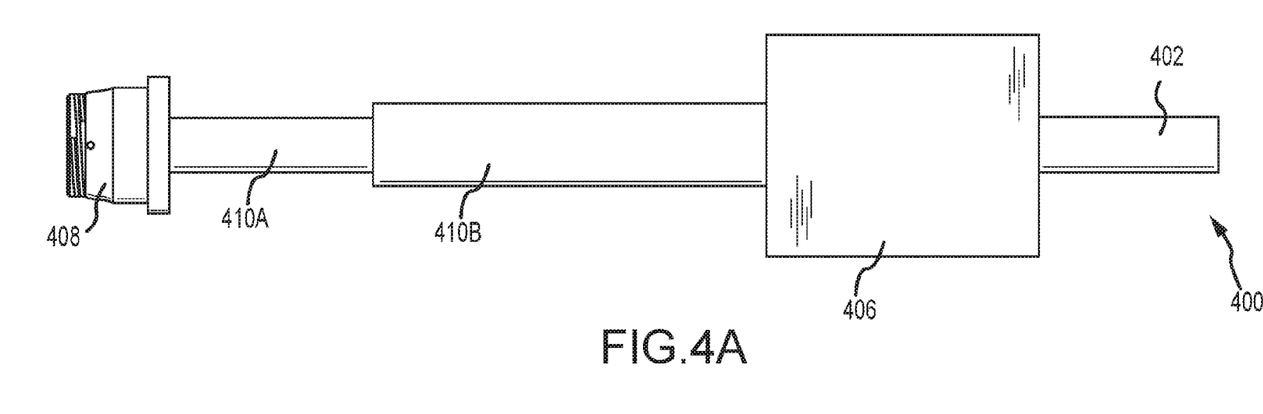
FIG. 4A is an injection molding system with a stepped extrusion screw in accordance with embodiments of the present disclosure.
Figure 4B:
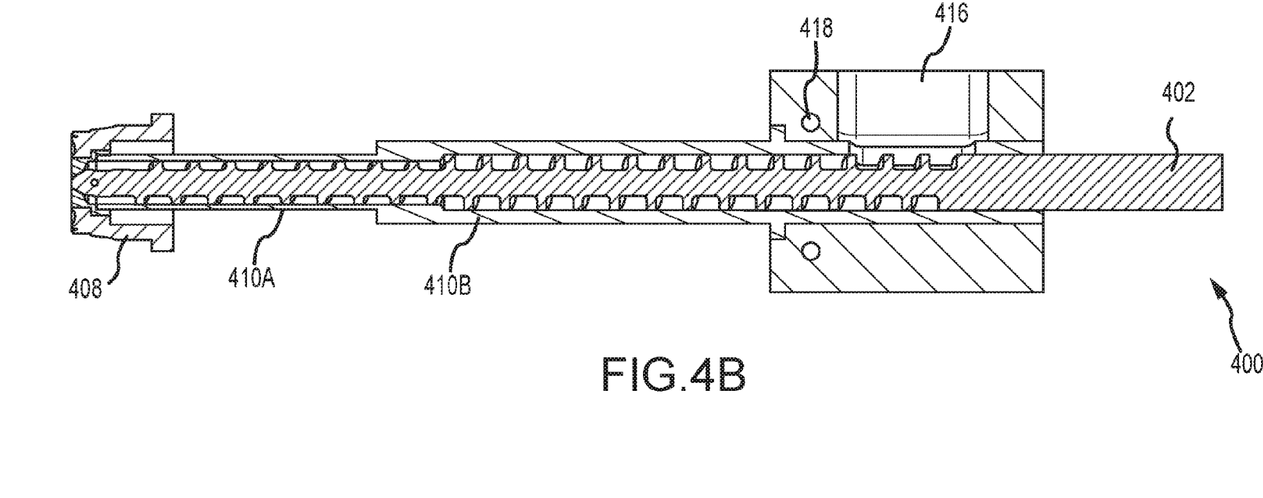
FIG. 4B is a sectional view of the injection molding system of FIG. 4A in accordance with embodiments of the present disclosure.
Figure 5:
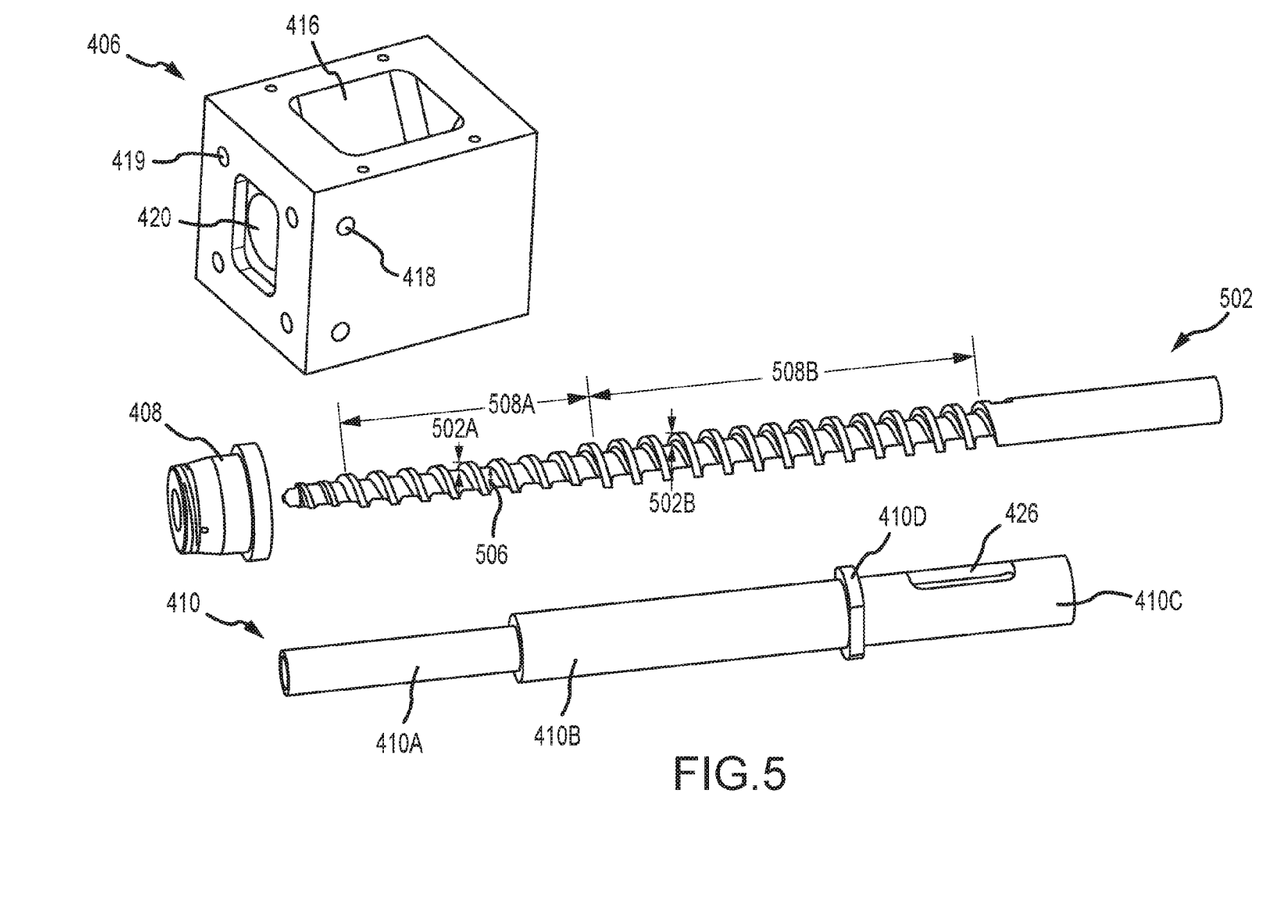
FIG. 5 is a perspective view of the injection molding system of FIG. 4A prior to assembly in accordance with embodiments of the present disclosure.

A stepped extrusion screw may be designed to accelerate the material flow into the mold when faster fill speeds are desired. FIG. 4A is an extrude-to-fill (ETF) injection system with a stepped extrusion screw in accordance with embodiments of the present disclosure. FIG. 4B is a sectional view of the ETF injection system of FIG. 4A. FIG. 5 is a perspective view of the components of FIG. 4A prior to assembly.

Referring to FIGS. 4A-5, the injection molding apparatus 400 may include a stepped extrusion screw 402. The inlet end of the stepped extrusion screw 402 may be of a sufficient size to receive pellets from the hopper 406, and the outer diameter of the screw 402 is stepped down along the length of the screw 402 toward the outlet end of the screw 402, resulting in a corresponding reduction in the inner and outer diameter of the barrel 410. The stepped extrusion screw 402 and barrel 410 may enable the outlet or hot end of the apparatus 400 to fit in tighter or smaller areas, which may facilitate locating gates on the inside of certain molded parts so that the outside surface of the parts may be entirely decorative, with the gates hidden from view on the inside surface of the parts. In other words, by stepping down the outer diameter of the screw 402 and the inner and outer diameter of the barrel 410 as the material in the barrel 410 is elevated in temperature to melt the material, the reduced diameter of the screw 402 and the barrel 410 allows a reduction in size of the outlet end of the apparatus 400 that enables the use of the apparatus 400 in otherwise prohibitively small areas.

With continued reference to FIGS. 4A-5, the stepped extrusion screw 402 and the barrel 410 may cause the molten material to accelerate out of the outlet or hot end of the apparatus 400, because the material is forced into a smaller cross-sectional area that accelerates the flow rate of the material. The accelerated flow rate of material may aide in filling small and intricate mold configuration without significantly reduced nozzle opening or mold gate geometry and may reduce the stress induced on the material and minimize part deformation.

With continued reference to FIGS. 4A-5, the stepped extrusion screw 402 may be placed inside the barrel 410. The barrel 410 may include a first section 410A and a second section 410B having a larger diameter than the first section 410A. A nozzle 408 may be coupled to an end of the first section 410A for delivering molten material into a mold. The barrel 410 may include an end section 410C with an opening 426 to receive raw material from a hopper block 406. The barrel 410 may include a barrel collar 410D that functions as a stopper when the hopper block 406 is assembled with the barrel 410.

The hopper block 406 may be coupled to the end section 410C of the barrel 410. The hopper block 406 may include a top opening 416 with a sloped side wall for a material to feed into the barrel 410 through an inlet 426 defined in the end section 410C. The hopper block 406 may include a hollow cylindrical portion 420 to slide onto the end barrel section 410C, and the hopper block 406 may be placed against a barrel collar 410D, which may be attached to the hopper block 406, for example, using fasteners inserted into holes 419 formed in the hopper block 406. The hopper block 406 may be cooled by circulating a cooling fluid, for example, circulating water or other cooling compounds, through channels 418.

As shown in FIG. 5, the stepped extrusion screw 502 may have a constant root diameter 506, but may include a first section 508A with a first flight height 502A, and a second section 508B with a second flight height 502B. For example, the stepped extrusion screw 502 may include a first screw section 508A of a smaller flight height 502A further along the length of the screw 502 where the raw material is heated and molten. The change from larger flight height to smaller flight height may increase the material flow into the mold, such that the pumping efficiency increases. The stepped extrusion screw 502 may also include a second section 508B of a larger flight height 502B near the hopper where a raw material is drawn into the barrel. The larger flight height 502B of the screw is efficient in feeding the material into the barrel from the hopper, such that the material is more easily fed into the barrel.

Figure 6A:
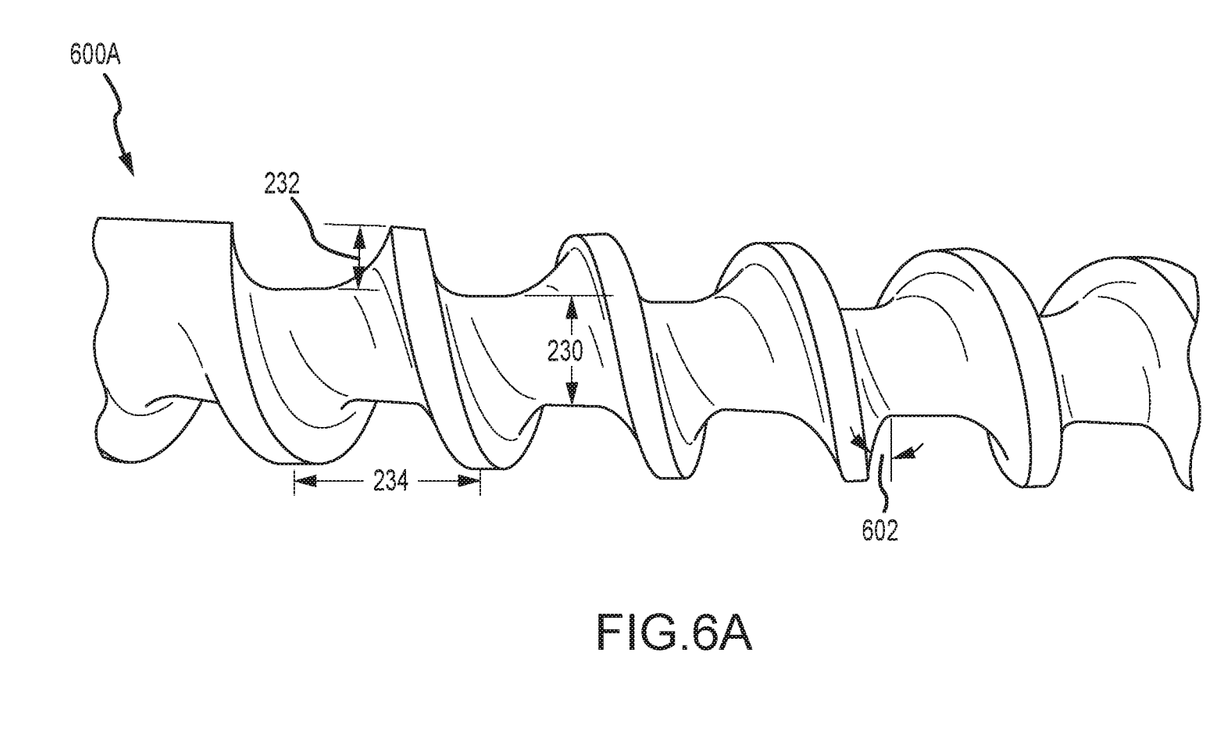
FIG. 6A illustrates an extrusion screw having a sharp geometry in accordance with embodiments of the present disclosure.
Figure 6B:
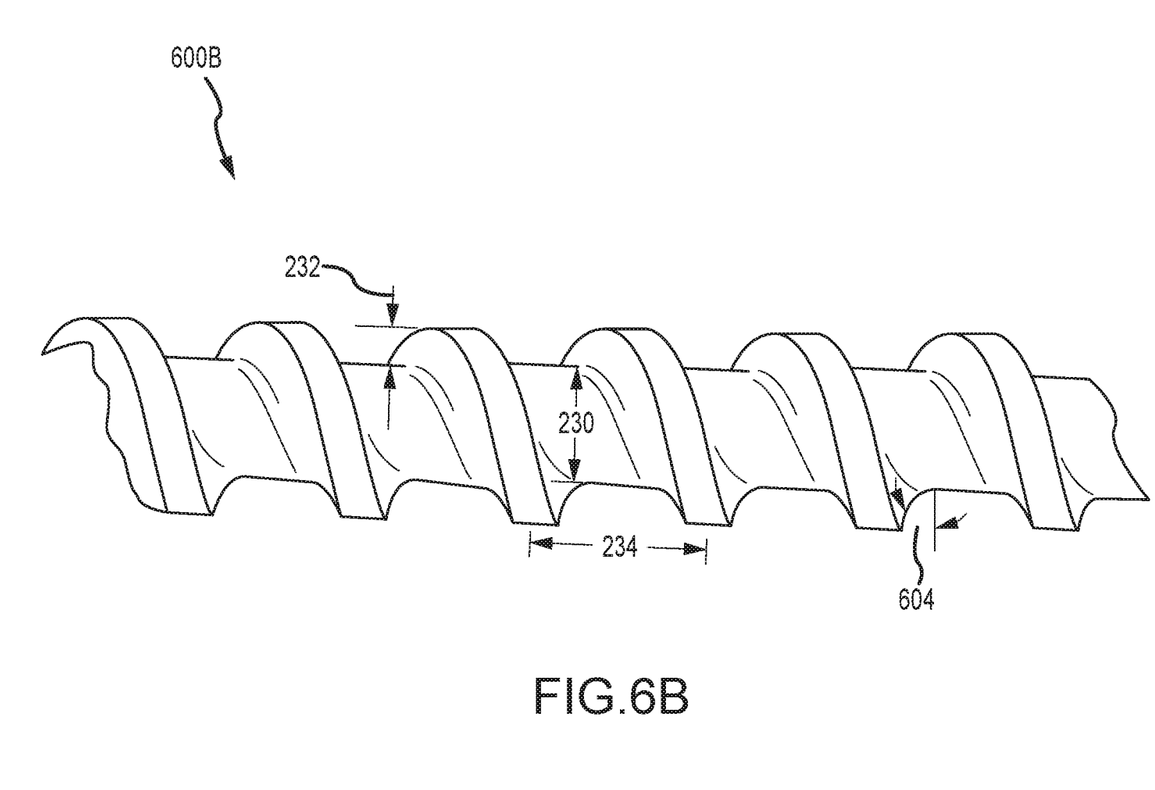
FIG. 6B illustrates an extrusion screw having a less sharp geometry in accordance with embodiments of the present disclosure.

The pumping efficiency may also vary with screw shape or geometry. For example, a sharp screw with a relatively small angle 602 as shown in FIG. 6A may be easier to feed the material into the barrel from the hopper, such as flake type samples. The less sharp screw with a relatively large angle 604 than angle 602 as shown in FIG. 6B may provide good mixing of the material, cold and hot. A screw may include a first portion of the less sharp geometry as shown in FIG. 6B near the nozzle and a second portion of sharp geometry as shown in FIG. 6A near the hopper (not shown). In some embodiments, screw flights positioned near the hopper may be more vertical (e.g., more perpendicular relative to a root diameter) than screw flights positioned near the nozzle. For example, the extrusion screw may have a more vertical flight geometry near the hopper to receive pelletized material from the hopper and efficiently pull the pellets into the extrusion barrel, an angled shallower flight in the temperature transition region to mix cold and hot material together, and another flight change to mix and pump material along the final length of the screw toward the nozzle.

The screw may include varying pitches (e.g., multiple different pitches) along its length to provide different pumping and mixing characteristics along its length. For example, depending on the molding application, the screw may be designed with a relatively small pitch, a relatively large pitch, or a combination of pitches. The change in pitch along the length of the screw may be gradual or progressive, or abrupt. For example, the pitch of the screw flights may gradually change (e.g., increase) along the length of the screw from the hopper to the nozzle. Additionally, or alternatively, the screw may include multiple sections defined along its length, and the sections may have different pitches relative to one another.

Figure 7:
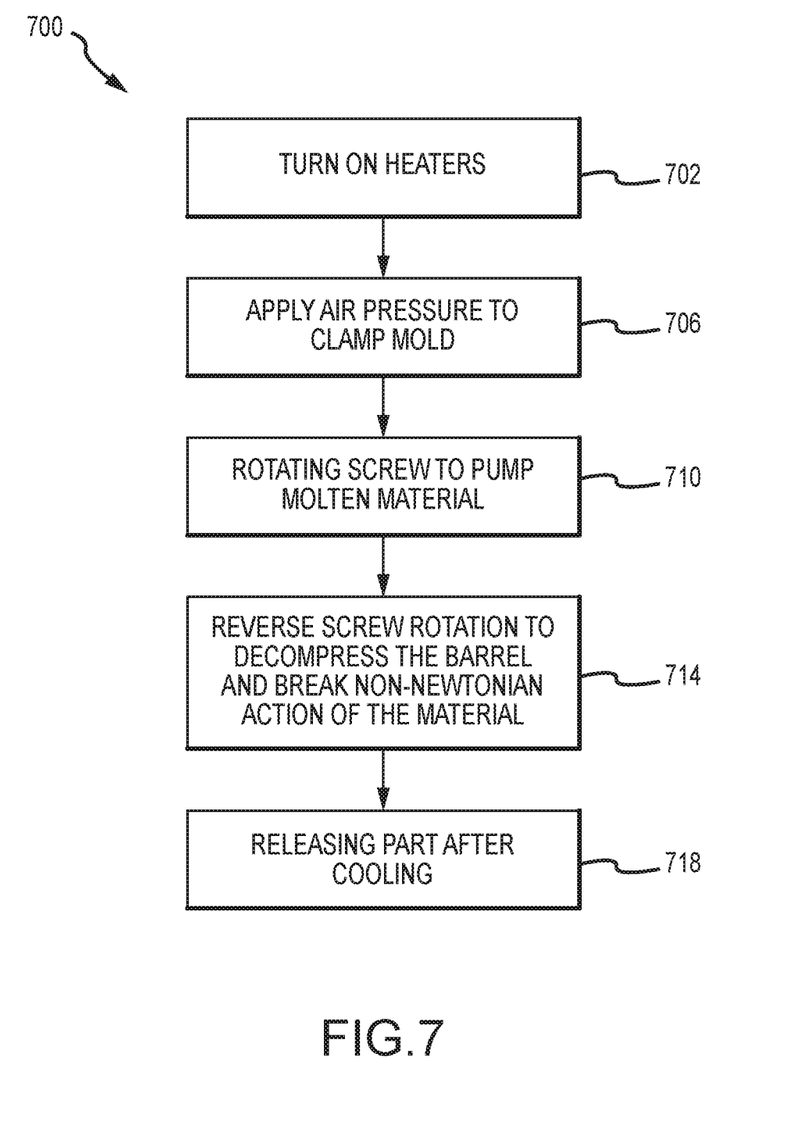
FIG. 7 is a flow chart illustrating steps for molding a part in accordance with embodiments of the present disclosure.

FIG. 7 is a flow chart illustrating steps for molding a part in accordance with embodiments of the present disclosure. Method 700 starts with turning on one or more heaters to melt a material inside a barrel at operation 702. The mold may be clamped by applying pressure at operation 706.

Method 700 may include removing support from behind the screw. Extrusion begins with the initial rotation of the extrusion screw which causes the screw to move axially relative to the barrel or the initial axial movement of the barrel relative to the screw to open the nozzle. Extrusion continues with screw rotation to pump the molten material into a mold until the mold is filled at operation 710. During the pumping of the material into the mold, the extrusion screw has no axial movement. After filling the mold cavity, there may be a holding time to hold extrusion pressure against the material in the mold.

Method 700 may further include reversing rotation of the extrusion screw to decompress the barrel and to break the non-Newtonian action of the material at operation 714. The reversal decompression cycle may break pressure build-up in the barrel. The decompression cycle may eliminate any hysteresis, and reset the ETF injection system to a low motor torque requirement at an extrusion start. The decompression cycle may also relieve the strain in any component of the machine frame. The non-Newtonian action of the material is to absorb direct force and push outward against the barrel wall, which may increase the force required to move the material in its intended path. The non-Newtonian action may be broken by reversal rotation of the extrusion screw which allows the continuous extrusion of material under a low injection pressure which may be 500 psi to 1,500 psi.

Method 700 may also include unclamping the mold by releasing the pressure at operation 718. Then, a molded part may be removed from the mold. For each molding cycle, the extrusion screw may rotate to move backward relative to the barrel or the barrel may move forward relative to the screw to open the nozzle and to move plastic forward to fill the mold. Then, the screw may reverse the rotation to move forward relative to the barrel or the barrel may move rearward relative to the screw to close the nozzle.

The ETF operation described above is very different from the operation of the traditional injection molding system 100 (see FIG. 1). The present ETF injection system does not include a recovery extrusion stage and an injection cycle like the traditional injection molding system. Referring to FIG. 1 again, the traditional molding process begins with rotating the extrusion screw 102 to churn plastic to generate shear heat while transferring plastic to the front end of the screw 102. During the recovery extrusion stage, the plastic is moved forward and the extrusion screw 102 is allowed to move backward for a pre-selected distance, which affects the shot size in addition to screw diameter. An injection cycle starts after the recovery extrusion stage. A very high force is applied to the back of the extrusion screw 102 by an injection cylinder 138 to advance the extrusion screw 102, which dislodges the cold slug and evacuates the plastic in the injection zone 112.

Low Pressure Molding Operation

The present ETF injection system requires much lower injection forces than the traditional injection molding system. For example, the present ETF injection system may generate the same pressure as the pressure in the mold cavity or slightly higher injection pressure, such as 5-10% higher injection pressure, than the pressure in the mold cavity may range from 500 to 1,500 psi. In contrast, an injection pressure of 20,000 psi to 30,000 psi may be required for the traditional injection molding system to provide the same pressure of 500 to 1,500 psi to the mold cavity. This allows the total power requirement for the ETF system to be 0.5 to 3 kilowatt hours of 110 volts or 208 volts of single phase electrical supply. The traditional injection molding system requires 6 to 12 kilowatt hours of 220 volt or 440 volt three phase electrical supply.

The low injection pressure may reduce the required clamping pressure for the mold. For example, the clamping pressure may be about 10% higher than the pressure required in the mold cavity. As a result of the low clamping pressure, molds may be formed of a lower cost material, such as aluminum, instead of steel for traditional molds. The low injection and clamping pressure may also reduce the machine size, which may reduce machine cost and operating costs. The ETF injection system is much smaller than the traditional injection molding system. Additionally, the extrusion under a lower pressure may result in more uniformly molded parts with consistent density, which may reduce part warping and improve product quality.

The present ETF injection system may include a low pressure clamping system for the mold, which may reduce damage to the tooling due to high clamping pressure from the traditional injection molding system.

In some embodiments, the present ETF injection system may include a front access table to facilitate insert molding and overmolding. The front access table allows an operator to access the mold with greater visibility.

The higher degree of injection force control, mold design flexibility, and machine design flexibility allows a wider range of possibilities for production of injection molding of discreet plastic parts and insert molded parts where discreet components or assemblies are placed into the injection mold to have plastic added to them in the molding process.

Figure 8:
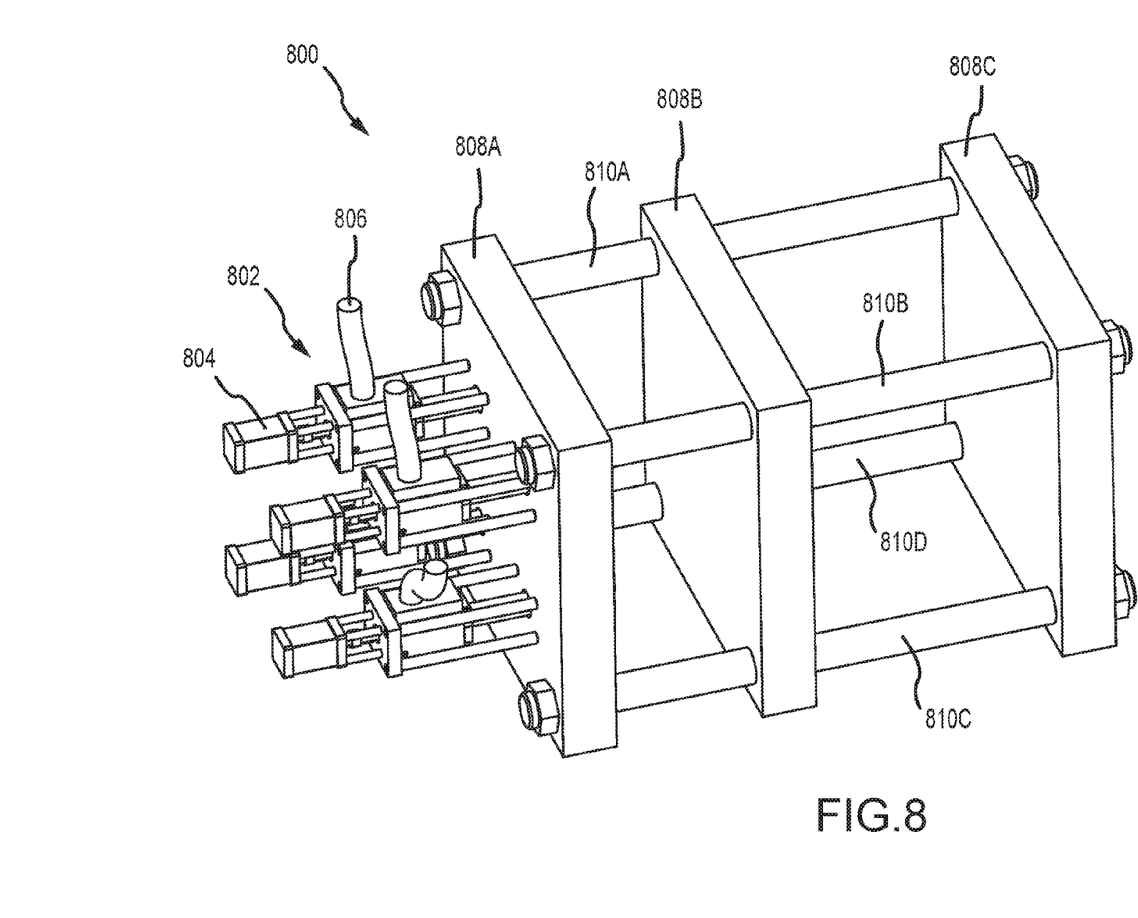
FIG. 8 is a simplified diagram illustrating an injection molding machine with multiple injection molding systems in accordance with embodiments of the present disclosure.

In some embodiments, a single injection molding system may include multiple ETF injection systems, which can fill a mold of multiple cavities or a large mold cavity from multiple gates. FIG. 8 is a simplified diagram illustrating an injection molding machine with multiple ETF injection systems in accordance with embodiments of the present disclosure. The number of ETF injection systems that may be included in a single injection molding system is not limited. In this particular example, system 800 may include four ETF injection systems 802, each of which may include subassemblies 804 and corresponding inlets 806 connected to one or more hoppers to receive materials from the hoppers. The injection systems 802 may be fed by gravity, vacuum, auger or other means to the individual feed tubes or inlets 806. In some embodiments, the inlets 806 may be connected to a single, common hopper. For example, a single hopper may accept material, such as plastic pellets, and may use a series of feed tubes or inlets to transport the plastic pellets to the individual injection systems 802 to allow their independent function within the system 800. Each ETF injection system 802 may be operated independently but coordinated to assure efficient molding.

Referring to FIG. 8, a single injection system 800 may include multiple ETF injection systems to fill a mold with a single cavity. The individual ETF injection systems 802 are coupled to a single mold having multiple gates (not shown) to fill a portion of the mold. The combination may be desirable because the resins in the injection systems are prepared for molding with the machine in a static state. Each injection system 802 may be controlled independently. Each injection system 802 may provide individual feedback to its respective controller. Each injection system 802 may have pressure sensing from a direct pressure sensor, a torque load on a motor coupled to the respective injection system, an amount of electricity consumed by the respective motor, or other pressure sensing parameters. Each injection system 802 may be arranged as a closed loop system and may be controlled individually. A central or main microprocessor may process data received from the injection systems 802 and control each injection system to individually or collectively cease material flow once a targeted pressure is achieved. The extrusion injection system 800 is a closed loop system that features a sensor-defined, output-based process that allows use of any combination of injection systems 802. The combined systems may allow for molding large parts with consistent part density, which leads to accurate and consistent dimensions for injection molded parts, and may reduce warping plastic parts. The combined system is more efficient than the traditional injection molding system which would deliver plastic from a single nozzle, through multiple runner branches, each branch causing a pressure loss that requires a much higher initial injection force. The high injection force requires more power and a more massive machine with higher operating costs while providing non-uniform plastic temperature and viscosity.

Referring to FIG. 8, a single injection system 800 may produce individual molded parts from two or more mold cavities utilizing two or more independently operating extrusion injection systems 802 individually aligned to each independent cavity within the mold. Each injection system 802 may be controlled independently. Each injection system 802 may provide individual feedback to its respective controller to ensure uniformity in each cavity of the mold. Each injection system 802 may have pressure sensing from a direct pressure sensor, a torque load on a motor coupled to the respective injection system, an amount of electricity consumed by the respective motor, or other pressure sensing parameters. Each injection system 802 may be arranged as a closed loop system for each respective mold cavity and may be controlled individually. A central or main microprocessor may process data received from the injection systems 802, and may individually cease material flow and collectively open and close the mold based on the data received from the individual injection systems 802. The extrusion injection system 800 is a highly efficient, compact, and self-contained assembly that fits into a small footprint allowing the individual injection systems 802 to be used in close proximity to one another. The extrusion injection system 800 is a closed loop system that features a sensor-defined, output-based process that allows use of any combination of injection systems 802. The combined systems may allow for molding individual parts with consistent part density and uniform weight, which leads to accurate and consistent dimensions for individual but common molded parts, and may improve performance when used in highly automated assembly operations. The combined system is more efficient than the traditional injection molding system which would deliver plastic from a single nozzle, through multiple runner branches, each branch causing a pressure loss that requires a much higher initial injection force. The high injection force requires more power and a more massive machine with higher operating costs while providing non-uniform material temperature and viscosity resulting in inconsistent individual part uniformity.

System 800 may also include a frame including vertical platens 808A-C and horizontal bars 810A-D at four corners of each platen. The platens are connected by the horizontal bars passing through holes in the platens. The vertical platens are substantially parallel to each other and spaced along the horizontal bars, which are substantially parallel to each other. A mold is placed between platens 808A and 808B. The position of platen 808B may be adjustable along the bars 810A-D, to accommodate a mold of a particular size. The frame may be assembled by fastening the bars against the platens 808A and 808C on two opposite ends of the bars 810A-D.

Molding Materials

The static heat generation and conduction used in the present ETF injection system is not sensitive to resin materials or properties, including, but not limited to, resin grade, purity, uniformity, and melt flow index among others.

For example, the present ETF injection system is capable of molding any thermoplastic materials, such as co-mingled/mixed post-consumer recycled plastics, a mixture of resins with different melt flow indexes, coming from different plastic classifications or chemical families, bio-based materials each of which are difficult to mold with the traditional injection molding system. In a further example, a mixture including two or more different resin pellets may be mixed to mold a part. Multiple plastics may have different processing characteristics, such as melt flow index, melting temperature, or glass transition temperature but the co-mingling of these materials does not present any issues to the ETF system.

The recycled plastics may include, but are not limited to, polyethylene (PE), high density polyethylene (HDPE), low density polyethylene (LDPE), polypropylene (PP), polyethylene terephthalate (PET), nylon (PA), polycarbonate (PC), polylactic acid (PLA), acrylonitrile butadiene styrene (ABS), polysulfone (PS), polyphenylene sulfide (PPS), polyphenylene oxide (PPO), polyetherimide (PEI), acrylic (PMMA) among others.

The present ETF injection system is capable of molding reinforced plastics with much higher fiber contents or mineral fillers than traditional injection molding machines can process. Generally, it is difficult to mold plastic reinforced with 50% by volume glass fiber or more by the traditional injection molding system, due to its reliance on the generation of shear heat that is based on resins that are 70% by volume or more petroleum based compounds. By using static heat generation in the present ETF injection system, the melt does not rely on any petroleum based resin content. For example, the reinforced plastic may contain more than 50% by volume of glass fibers, cellulose fibers, mineral aggregate or carbon fibers.

The present ETF injection system is less susceptible to shear degradation unlike the traditional injection molding system, due to static heat conduction. The static heat generation provides accurate temperature control, which helps avoid overheating the material. The extrusion screw may also be sized by varying screw length and screw root diameter to control residence times to avoid thermal degradation.

The present ETF injection system may be used for molding temperature and pressure sensitive bio-based resins or plastics which are sensitive to shear degradation. The bio-based resins include cellulose materials, plant starch resins and the sugar based resins, which may be used for products such as medical implants, including, but not limited to, bone screws, bone replacements, stents, among others.

The present ETF injection system may also be used for temperature and pressure/shear sensitive metal injection molding (MIM). The MIM feedstocks may also be sensitive to temperatures, residence times and shear pressure, like bio-based resins. The present ETF injection system may mold polymers with up to 80% by volume loading of stainless steel or other metals.

The present ETF injection system may also be used for injecting food pastes, which may be extruded into molds heated to baking temperatures to form food products of desired shapes.

The molding materials may include, but are not limited to, amorphous thermoplastics, crystalline and semi-crystalline thermoplastics, virgin resins, fiber reinforced plastics, recycled thermoplastics, post-industrial recycled resins, post-consumer recycled resins, mixed and comingled thermoplastic resins, organic resins, organic food compounds, carbohydrate based resins, sugar-based compounds, gelatin/ propylene glycol compounds, starch based compounds, and metal injection molding (MIM) feedstocks.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention. All of the features disclosed can be used separately or in various combinations with each other.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. An apparatus comprising:
a barrel comprising a first section having an end associated with a mold through a nozzle, a second section coupled to a hopper configured to fill a material into the barrel, and a temperature transition section between the first section and second section;
one or more heaters associated with the first section of the barrel to heat the material inside the barrel; and
an extrusion screw placed inside the barrel and rotatable clockwise and counter-clockwise relative to the barrel;
wherein the barrel or the extrusion screw is movable in an axial direction between a first position in which the extrusion screw rotates relative to the barrel to continuously extrude the heated material into the mold through the nozzle and a second position in which the extrusion screw closes the nozzle; and
wherein the extrusion screw is restricted from moving in the axial direction while extruding the heated material into the mold.

2. The apparatus of claim 1, wherein the material is selected from a group consisting of amorphous thermoplastics, crystalline or semi-crystalline thermoplastics, virgin resins, reinforced plastic with glass fibers, carbon fibers, or cellulose fibers, recycled thermoplastics, mixed and comingled thermoplastic resins, organic resins, organic food compounds, carbohydrate based resins, sugar-based compounds, gelatin, propylene glycol compounds, starch based compounds, and metal injection molding (MIM) feedstocks.

3. The apparatus of claim 1, wherein the extrusion screw comprises a conductive material selected from a group consisting of copper, copper alloys, brass, brass alloy, carbon steel, stainless steel, any of which may be treated with chrome or other specialty plating.

4. The apparatus of claim 1, wherein the barrel or the extrusion screw comprises a portion of magnetic material for inductive heating.

5. The apparatus of claim 1, wherein the hopper is configured to circulate a cooling fluid.

6. The apparatus of claim 1, wherein the temperature transition section of the barrel has a length that allows the material to form a seal region to effectively pump the molten material.

7. The apparatus of claim 1, wherein the extrusion screw and the barrel have stepped outer and inner diameters.

8. The apparatus claim 1, wherein the extrusion screw is fixed in the axial direction.

9. The apparatus of claim 1, wherein the material is heated primarily by the one or more heaters.

10. An apparatus comprising a plurality of the apparatus according to claim 1 arranged to fill a single mold cavity from a plurality of gates to a mold cavity or arranged to fill a plurality of mold cavities within a mold.

11. The apparatus of claim 10, wherein each apparatus of the plurality of apparatus is controlled independently to cease material flow once a targeted pressure is achieved.

12. The apparatus of claim 10, wherein each apparatus of the plurality of apparatus provides individual pressure data to a respective controller.

13. An extrude-to-fill injection molding apparatus comprising:
a barrel including an end associated with a mold through a nozzle;
a hopper coupled to the barrel and configured to fill a material into the barrel;
one or more heaters associated with the barrel at a distance from the hopper to heat the material; and
an extrusion screw received inside the barrel and configured to rotate clockwise and counter-clockwise;
wherein the barrel or the extrusion screw is movable in an axial direction between a first position in which the extrusion screw rotates relative to the barrel to pump the heated material into the mold through the nozzle and a second position in which the extrusion screw closes the nozzle; and
wherein the extrusion screw is restricted from moving in the axial direction while pumping the heated material into the mold.

14. The apparatus of claim 13, wherein the extrusion screw comprises a constant root diameter along the length of the extrusion screw.

15. The apparatus of claim 13, wherein the extrusion screw comprises a constant flight height.

16. The apparatus of claim 13, wherein the extrusion screw comprises a first portion having a geometry configured to effectively mix material near the nozzle and a second portion having a geometry configured to efficiently feed materials from the hopper.

17. The apparatus of claim 13, wherein the extrusion screw comprises a first portion having a first flight height and a second portion having a second larger flight height than the first portion, the first portion having an end matched to the nozzle associated with the barrel to flow the heated material into the mold.

18. The apparatus of claim 17, wherein the first portion is configured to efficiently pump a molten material, and the second portion is configured to effectively feed and mix materials, the second portion being closer to the hopper than the first portion.

19. The apparatus of claim 13, wherein a clearance between the extrusion screw and the barrel is large enough to reduce shear heat generation in the material by screw rotation.

20. An apparatus comprising a plurality of the apparatus according to claim 13 arranged to fill a single mold cavity from a plurality of gates to a mold cavity or arranged to fill a plurality of mold cavities within a mold.

21. The apparatus of claim 20, wherein each apparatus of the plurality of apparatus is controlled independently to cease material flow once a targeted pressure is achieved.

22. The apparatus of claim 20, wherein each apparatus of the plurality of apparatus provides individual pressure data to a respective controller.

23. An apparatus comprising:
an extrusion screw being hollow inside configured to receive a heater inside the extrusion screw, the extrusion screw configured to rotate clockwise and counter-clockwise;
a barrel outside the extrusion screw, the barrel having one end associated with a mold through a nozzle;
a hopper coupled to an opposite end of the barrel and configured to feed a material into the barrel; and
one or more heaters placed outside of the barrel at a distance from the hopper to heat the material;
wherein the barrel or the extrusion screw is movable in an axial direction between a first position in which the extrusion screw rotates relative to the barrel to pump the heated material into the mold through the nozzle and a second position in which the extrusion screw closes the nozzle; and
wherein the extrusion screw is restricted from moving in the axial direction while pumping the heated material into the mold.

24. A method of fabricating a component, the method comprising:
turning on one or more heaters to melt a material inside a barrel;
positioning an extrusion screw in a first position relative to the barrel in which the extrusion screw is spaced from a nozzle associated with the barrel;
rotating the extrusion screw while in the first position to pump the molten material through the nozzle into a mold until the mold is filled, wherein the extrusion screw is restricted from moving in an axial direction while pumping the molten material through the nozzle into the mold; and
positioning the extrusion screw in a second position in which the extrusion screw closes the nozzle by reversing rotation of the extrusion screw to decompress the barrel and to break the non-Newtonian action of the material.

25. The method of claim 24, wherein the material is selected from a group consisting of amorphous thermoplastics, crystalline and semi-crystalline thermoplastics, virgin resins, fiber reinforced plastics, recycled thermoplastics, post-industrial recycled resins, post-consumer recycled resins, mixed and comingled thermoplastic resins, organic resins, organic food compounds, carbohydrate based resins, sugar-based compounds, gelatin, propylene glycol compounds, starch based compounds, and metal injection molding (MIM) feedstocks.

* * * * *